United States Patent [19]

Shirato et al.

[11] Patent Number: 4,458,256

[45] Date of Patent: Jul. 3, 1984

[54] INK JET RECORDING APPARATUS

[75] Inventors: Yoskiaki Shirato, Yokohama; Yasushi Takatori, Sagamihara; Toshitami Hara, Tokyo; Yukuo Nishimura, Sagamihara; Michiko Takahashi, Tokyo, all of Japan

[73] Assignee: Canon Kabushiki Kaisha, Tokyo, Japan

[21] Appl. No.: 367,765

[22] Filed: Apr. 12, 1982

Related U.S. Application Data

[63] Continuation of Ser. No. 123,704, Feb. 22, 1980, abandoned.

[30] Foreign Application Priority Data

Mar. 6, 1979 [JP] Japan ............................ 54-25928
Apr. 2, 1979 [JP] Japan ............................ 54-39480

[51] Int. Cl.[3] ............................ G01D 15/18
[52] U.S. Cl. ............................ 346/140 R
[58] Field of Search ............................ 346/140 R, 76 PH

[56] References Cited

U.S. PATENT DOCUMENTS 4,138,605 2/1979 Stapleton ............ 346/76 PH X
4,243,994 1/1981 Kobayashi ............ 346/140 R

*Primary Examiner*—Joseph W. Hartary
*Attorney, Agent, or Firm*—Fitzpatrick, Cella, Harper & Scinto

[57] ABSTRACT

An ink jet recording apparatus comprises actuating portions and lead electrodes for conducting current. The lead electrodes are wired in such a manner that a conductive member is disposed on a surface which is at a side where the ink droplets are ejected and said conductive member is a part of said lead electrode, or one actuating portion is provided with a plurality of lead electrodes, and these lead electrodes are led, substantially in parallel, to terminals which are located at a side opposite to the ejection port with respect to the actuating portion, or one chamber is provided with a plurality of actuating portions which are separated from one another, and lead electrodes connected to the actuating portions are led, substantially in parallel, to terminals which are located at a side opposite to the ejection port with respect to the actuating portion, or the actuating portion is disposed on a conductive member intervened with an insulating layer and the conductive member is a part of the lead electrode.

22 Claims, 12 Drawing Figures

INK JET RECORDING APPARATUS

This is a continuation of application Ser. No. 123,704, filed Feb. 22, 1980, now abandoned.

BACKGROUND OF THE INVENTION

1. Field of the Invention

This invention relates to an ink jet recording apparatus, and more particularly, to the apparatus provided with an improved arrangement of signal input means.

2. Description of the Prior Art

Non-impact recording methods have recently drawn attention since noise upon recording is negligibly small. Among them, ink jet recording methods are known as a very powerful method. According to the ink jet recording method, a high speed recording is possible and furthermore, recording can be effected on ordinary papers without any special fixing treatment.

Ink jet recording method comprises projecting droplets of a recording liquid (ink) toward a record member. The ink jet recording methods are classified into several types based on the method of forming droplets and the method of controlling the projecting direction of the ink.

As energy sources for ejecting the recording liquid through an ejecting port (orifice), there may be used electrostatic attraction pressure change caused by mechanical vibration, pressure change caused by heat energy and the like.

One of representative ink jet recording methods is a continuous droplet ink jet system such as Sweet system (U.S. Pat. No. 3,596,275), Lewis and Brown system (U.S. Pat. No. 3,298,030) and the like. These systems comprise generating a liquid droplet stream having controlled charge amount by a means for generating continuous vibration, propelling the liquid droplets between deflection electrodes under a uniform electric field so as to control the trajectory of the liquid droplets, and projecting the liquid droplets toward a record member.

Another representative ink jet recording method is the ink-on-demand system such as Stemme system (U.S. Pat. No. 3,747,120) which comprises applying electric recording signals to a piezoelectric vibrator attached to a recording head having an orifice for ejecting a recording liquid (ink), changing the signals to the corresponding mechanical vibration of the piezoelectric vibrator and propelling ink droplets toward a record member by ejecting the droplets through the orifice when necessary.

A further ink jet recording system different from the above mentioned systems is that disclosed in Japanese Patent Application No. 118798/1977, and U.S. patent application Ser. No. 948,236 filed Oct. 3, 1978. This system comprises applying a thermal pulse as an information signal to a recording liquid introduced into a liquid chamber, causing the change of state of the liquid to produce an acting power, ejecting and propelling droplets of the recording liquid toward a record member.

According to the various systems above, there remain some technical problems to be solved.

One is to develop a recording apparatus containing ejecting orifices in a multi-array form so as to make a high speed recording by ink droplets. In this case, the apparatus is required to eject uniform ink droplets stably at a high density so as to improve quality of recorded letters and resolution.

The other is to produce a recording apparatus of high durability and provided with a minute structure of high precision.

However, it is not easy to satisfy such requirements for the apparatuses, especially from the manufacturing point of view. For example, a high technique is necessary to combine a plurality of nozzle portions each of which is made of a very small nozzle having a fine port so as to produce a recording apparatus of a multi-array since the nozzles are so minute. Moreover, it is required that each structure element is uniform and of high reliability and therefore, it is not easy to manufacture the recording apparatus in good yield.

SUMMARY OF THE INVENTION

An object of the present invention is to provide an ink jet recording apparatus capable of solving the above mentioned technical problems.

Another object of the present invention is to provide an ink jet recording apparatus which can be simply and precisely manufactured and can stably produce a record of high quality at a high speed for a long time.

A further object of the present invention is to provide an ink jet recording apparatus of a multi-orifice array type which can be easily manufactured with high precision.

Still another object of the present invention is to provide an ink jet recording apparatus of a multi-orifice array type which is of high reliability and a long life.

A still further object of the present invention is to provide an ink jet recording apparatus of a multi-orifice array type which is provided with lead electrode groups suitable for matrix driving of the actuating portions.

Still another object of the present invention is to provide an ink jet recording apparatus of a multi-orifice array type where a large amount of current can be handled.

A still further object of the present invention is to provide an ink jet recording apparatus of a multi-orifice array type where current can be uniformly applied to each of the desired portions.

According to one aspect of the present invention, there is provided an ink jet recording apparatus which comprises:

a plurality of actuating portions for a recording ink,
lead electrodes connected to the actuating portions for conducting current thereof,
the actuating portions and the lead electrodes being formed on a substrate, each of the actuating portions being provided with a chamber communicating with a port for ejecting the recording ink and accommodating the recording ink before ejection, the ink being ejected from the port for ejection to form droplets, at least a part of the droplets being attached to a record member for recording, characterized in that a conductive member is disposed on a surface which is at a side where the ink droplets are ejected and said conductive member is a part of said lead electrode.

According to another aspect of the present invention, there is provided an ink jet recording apparatus similar to the above aspect except that it is characterized in that one actuating portion is provided with a plurality of lead electrodes, and these lead electrodes are led, substantially in parallel, to terminals which are located at a side opposite to the ejection port with respect to the actuating portion.

According to a further aspect of the present invention, there is provided an ink jet recording apparatus similar to the above aspect except that it is characterized in that one chamber is provided with a plurality of actuating portions which are separated from one another, and lead electrodes connected to the actuating portions are led, substantially in parallel, to terminals which are located at a side opposite to the ejection port with respect to the actuating portion.

According to a further aspect of the present invention, there is provided an ink jet recording apparatus which comprises:

a plurality of actuating portions for a recording ink, lead electrodes connected to the actuating portions for conducting current thereto, each of the actuating portions being provided with a chamber communicating with a port for ejecting the recording ink and accommodating the recording ink before ejection, the ink being ejected from the port for ejection to form droplets, at least a part of the droplets being attached to a record member for recording, characterized in that the actuating portion is disposed on a conductive member intervened with an insulating layer and the conductive member is a part of the lead electrode.

DESCRIPTION OF THE PREFERRED EMBODIMENTS

The present invention will be explained in detail below referring to the Figures.

Figure 1:
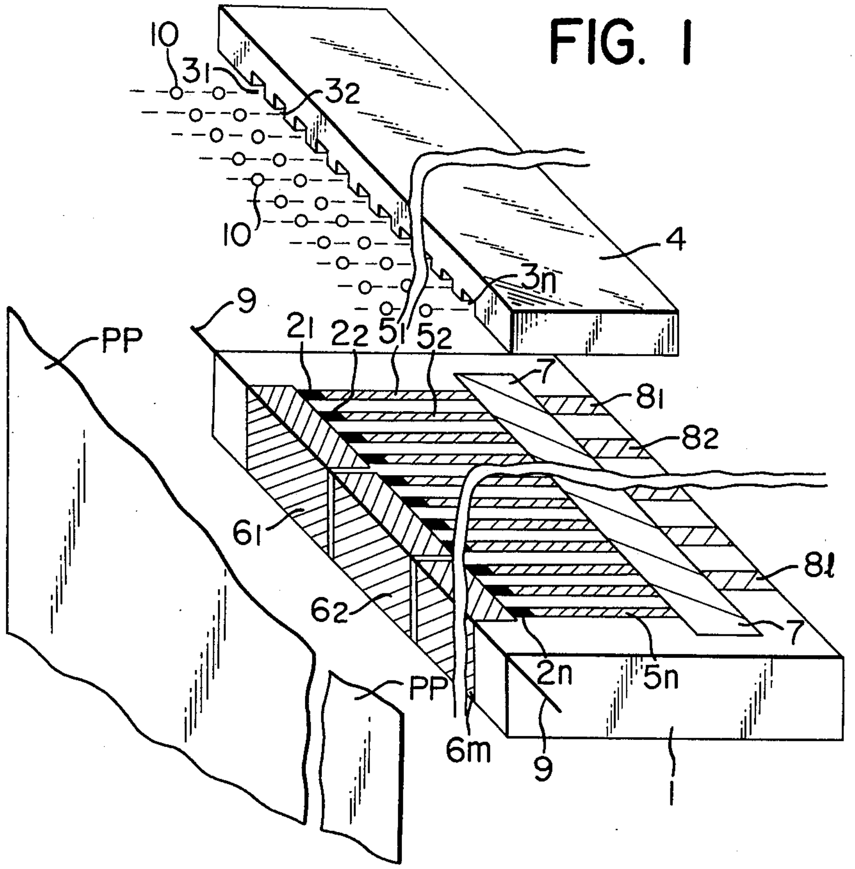
FIG. 1 and FIG. 2 are schematic perspective views of an embodiment of the present invention.
Figure 2:
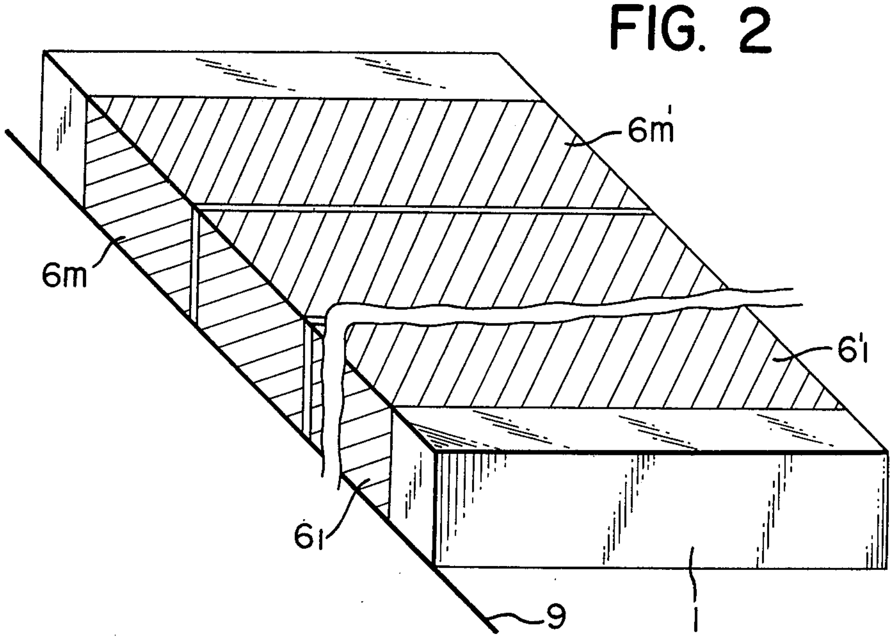

Referring to FIG. 1 and FIG. 2, one embodiment of the present invention is explained. In FIG. 1, only the recording head is explained so that it is illustrated in a dismounted state, and the recording ink supplying system and the circuits for driving the head are not shown.

In FIG. 1, substrate 1 is provided with resistive heaters $2_1$, $2_2$ - - - , $2_n$ as actuating portions and grooved plate 4 is provided with long grooves $3_1$, $3_2$ - - - , $3_n$ which define grooves for accommodating ink are the substrate 1 and plate 4 integrated in such a way that the resistive heaters are brought to the corresponding long grooves, for actual use.

To the resistive heaters $2_1$, $2_2$ - - - , $2_n$ are connected individual lead electrodes $5_1$, $5_2$ - - - , $5_n$ corresponding to the resistive heaters and common lead electrodes $6_1$, $6_2$ - - - , $6_m$. The common lead electrode is commonly connected to a unit composed of several resistive heaters. Individual lead electrodes $5_1$, $5_2$ - - - , $5_n$ are connected to a matrix wiring. From the matrix wiring are led "l" terminals $8_1$, $8_2$ - - - , $8_l$ where "l" is smaller than "n". Common lead electrodes $6_1$, $6_2$ - - - , $6_m$ are connected to terminals $6_1'$, - - - , $6_m'$ along the back surface of substrate 1 as illustrated in FIG. 2.

In this embodiment shown in FIG. 1 and FIG. 2, recording ink is introduced into long grooves $3_1$, $3_2$, - - - , $3_n$ from an ink supplying system (not shown) and then electric pulse signals are applied to resistive heaters $2_1$, $2_2$ - - - , $2_n$ by way of terminals $8_1$, $8_2$ - - - , $8_l$ and $6_1'$, - - - , $6_m'$. In accordance with application of electric pulse signals, resistive heaters $2_1$, $2_2$, - - - , $2_n$ generate heat pulses, and heat pulses immediately cause a change of state of the ink such as vaporization and the like and thereby an actuating force is applied to the ink itself. As a result, the ink is ejected in the form of small droplet 10 through orifices formed by the end portions of the long grooves arranged along the thick line 9. Small droplets 10 fly at a speed corresponding to the above mentioned actuating force and attach to a record member placed in front of the orifices to effect recording with ink droplets. The size of the ink droplets ejected from the orifices varies depending upon the amount of electric energy applied to the resistive heater, transmission efficiency of the converted heat energy to the ink, energy conversion efficiency of the resistor, the size of the orifice, inner size of the groove, the distance from the orifice to the resistor, the actuating force applied to the ink, the amount of ink subjected to the actuating force, and specific heat, thermal conductivity, boiling point, latent heat of vaporization and the like of the ink. By changing one or more of the above mentioned factors, the size of the ink droplets 10 can be easily controlled and thereby recording can be effected with an optional droplet size or spot size.

There are various types of resistive heater $2_1$, $2_2$ - - - , $2_n$ such as thick film type, thin film type, semiconductor type and the like. Any one of them can be used in the present invention. If recording at a high speed and a high resolution is particularly desired, a thin film type of resistive heater is preferable.

The ink used in the present invention may be prepared by dissolving or dispersing a humectant such as ethyleneglycol and the like, surfactant, various dyes and the like in a solvent such as water, alcohols (e.g. ethanol), toluene and the like. The ink thus produced is preferably filtrated with a filter, or when the ink is used, the ink conduit is preferably provided with a filter in order to prevent clogging of the ejecting orifice. Such a countermeasure is effective as in conventional ink jet recording systems.

In the above mentioned apparatus illustrated in the attached drawing, the structure and connection of lead electrodes as shown in the drawing are employed on the basis of the following two reasons.

(1) Since minute orifices of usually 5–250 microns in diameter should not be choked, it is substantially impossible to dispose terminals for lead electrodes at the orifice array side 9.

(2) A space for mounting lead electrodes, in particular, common lead electrodes, is very narrow at the orifice array side 9 on the substrate. If the common lead electrodes are arranged within such narrow region, a relatively large amount of signals, that is, a large amount of electric current, is treated with difficulty.

The distance between the orifice the array 9 and array of resistive heaters $2_1, 2_2, \text{- - -}, 2_n$ largely affects the state of ejecting ink droplets. The larger the distance, the oftener the unstable ejection of ink droplets occurs. Therefore, the distance can not be large, but should be small, and it is difficult to obtain a space for arranging lead electrodes.

In view of the foregoing, the way of leading the lead electrodes as illustrated is particularly effective when many actuating portions for ejection of ink are arranged at a high density on the same surface of a substrate.

Figure 3:
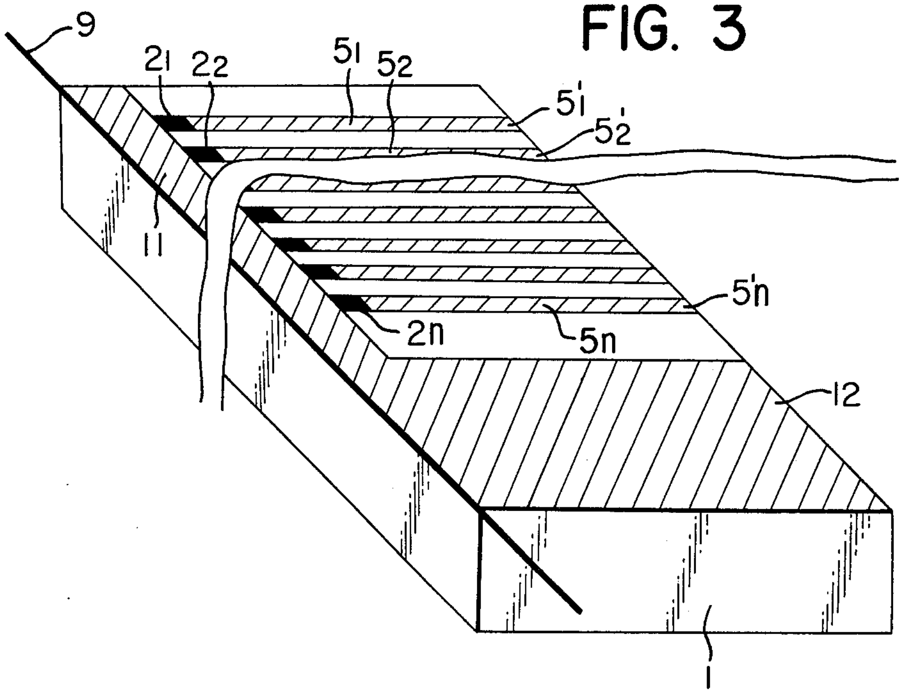
FIG. 3 is a schematic perspective view of a second embodiment of the present invention.
Figure 4:
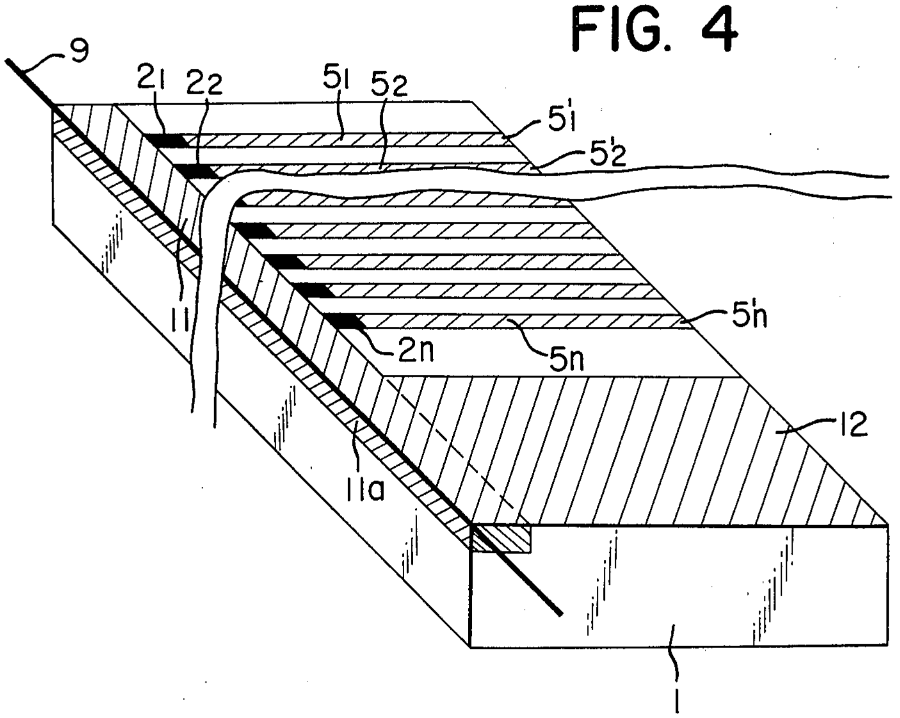
FIG. 4 is a schematic perspective view of a modification of FIG. 3 embodiment.

Referring to FIG. 3 and FIG. 4, another embodiment of the present invention is explained.

In FIG. 3, there is shown only a substrate 1 for mounting resistive heaters. The structure of the recording head (not shown) and the principle of ejecting ink droplets are substantially the same as those in FIG. 1, and therefore, the explanation thereof is omitted.

"n" pieces of resistive heaters $2_1, 2_2 \text{- - -}, 2_n$" on substrate 1 are connected to terminals $5_1', 5_2' \text{- - -}, 5_n'$, respectively through lead electrodes $5_1, 5_2, \text{- - -}, 5_n$. On the other hand, lead electrode 11 common to resistor $2_1$, $2_2 \text{- - -}, 2_n$ is led in a direction parallel to orifice array 9 and then led to terminal 12 arranged at an end of substrate 1 apart from the array of the resistors since the distance between orifice array 9 and resistor array is very small and it is difficult to dispose a terminal there. Then a grooved plate (not shown) necessary for ejecting ink droplets which is provided with "n" pieces of resistors $2_1, 2_2 \text{- - -}, 2_n$ should be mounted on substrate 1.

Another feature of the present invention is that the voltage impressed to the actuating portion is substantially the same in each actuating portion regardless of input recording information. This is very important when resistance of the thin film electrode is not negligible and electric pulse signals are simultaneously applied to many actuating portions.

An effective means for solving this problem is to decrease the resistance of the common lead electrode as illustrated in FIG. 3. One countermeasure is shown in FIG. 4.

In the following, FIG. 4 is explained as an improved modification of FIG. 3.

Referring to FIG. 4, lead electrodes are formed on substrate 1 by vapor deposition or sputtering. In particular, common lead electrode 11 at a region 11*a* between orifice array 9 and array of resistive heaters $2_1, 2_2 \text{- - -}$, $2_n$ is made in a form of a thick film by plating or by burrying metal bar so as to decrease the electric resistance of common lead electrode 11 which is forced into the narrow region.

When this apparatus is driven by a constant voltage power source, the constant voltage V is applied between terminals $5_1', 5_2' \text{- - -}, 5_n'$ and common lead electrode 12.

At this time, if a plurality of resistors are driven simultaneously, the larger the number of resistors thus driven, the more the fluctuation of voltage impressed to the resistors. However, the structure as shown in FIG. 4 where the common lead electrode 11 has a low resistance can suppress the fluctuation of voltage impressed to each resistive heater $2_1, 2_2 \text{- - -}, 2_n$ to a low level and thereby ink can be stably ejected.

In case of matrix driving, the apparatus illustrated in FIG. 1 and FIG. 2 is better than the apparatus illustrated in FIG. 4.

A feature common to the above mentioned illustrated embodiments is that for the purpose of effecting stable ejection of ink droplets, the distance between the orifice array and the actuating portion disposing line, for example, resistive heater disposing line, is shortened by concentrating the terminals for the lead electrodes connected to the actuating portions to a side opposite to the orifice array with respect to the actuating portions.

Figure 5:
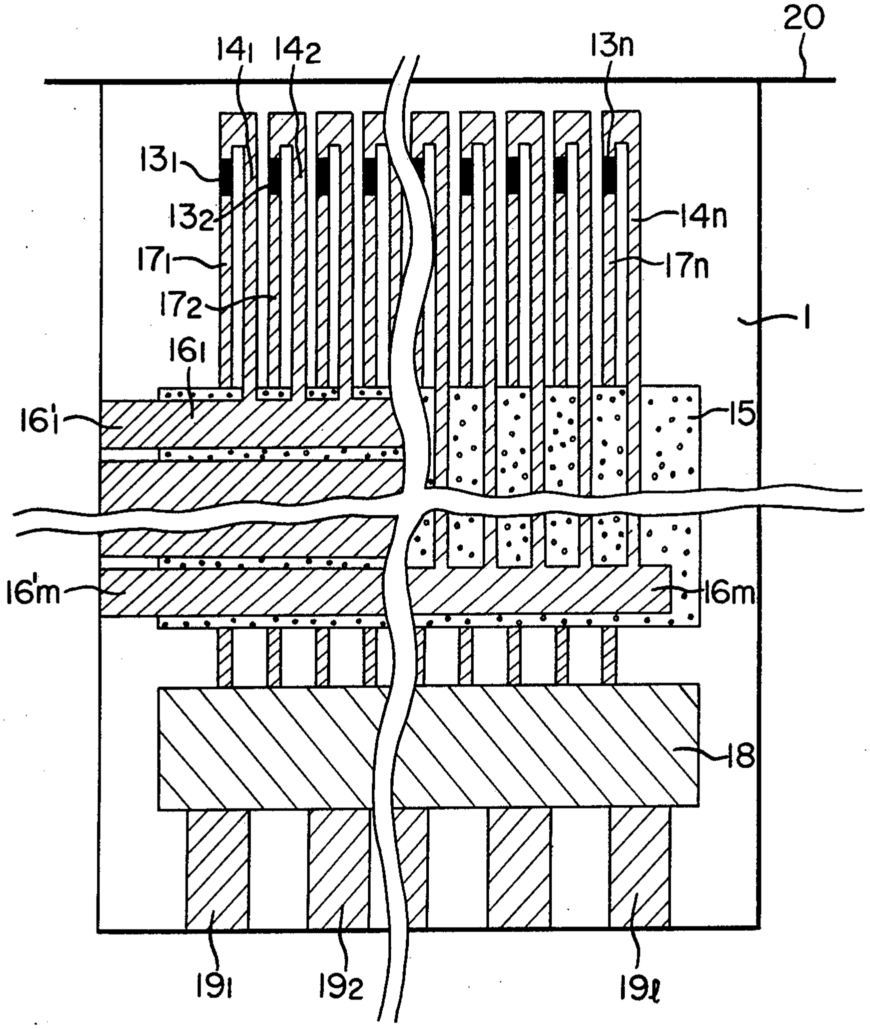
FIG. 5 is a schematic plan view of a further embodiment utilizing a single resistive heater for each actuating chamber.

FIG. 5 shows a further embodiment of a substrate 1 provided with resistive heaters. A recording apparatus is completed by mounting a grooved plates (not shown) similar to that of plate 4 in FIG. 1 on the substrate 1.

FIG. 5 is a plane view of substrate 1, and "n" pieces of resistive heaters $13_1, 13_2 \text{- - -}, 13_n$ are connected to lead or return electrodes $14_1, 14_2 \text{- - -}, 14_n$ which are returned on the same surface in parallel to the individual lead electrodes. And the returned lead electrodes are connected to common electrodes $16_1, \text{- - -}, 16_m$ of low resistance on an insulating layer 15 and then connected to terminals $16_1', \text{- - -} 16_m'$ for leading outside of substrate 1. On the other hand, individual lead electrodes $17_1, 17_2 \text{- - -} 17_n$ lead outside of substrate 1 by way of matrix wired portion 18 and terminals less than "n" pieces, $19_1, 19_2 \text{- - -} 19_l$. The thick line 20 shows an array of the orifices.

The first advantage of embodiment of FIG. 5 is that the distance between orifice array 20 and an array of resistive heaters $13_1, 13_2 \text{- - -}, 13_n$ can be optionally shortened and further all lead electrodes can be disposed with a fairly large area along the conduits of recording ink.

The second advantage is that handling in photolithography or the like is very easy since patterns of all elements are formed on the same surface and this is different from the embodiment in FIG. 1 and FIG. 2.

The third advantage is that there is no fear that lead electrodes are broken when the surface of orifice is ground and shaped after a grooved plate (not shown) is mounted on substrate 1.

Figure 6:
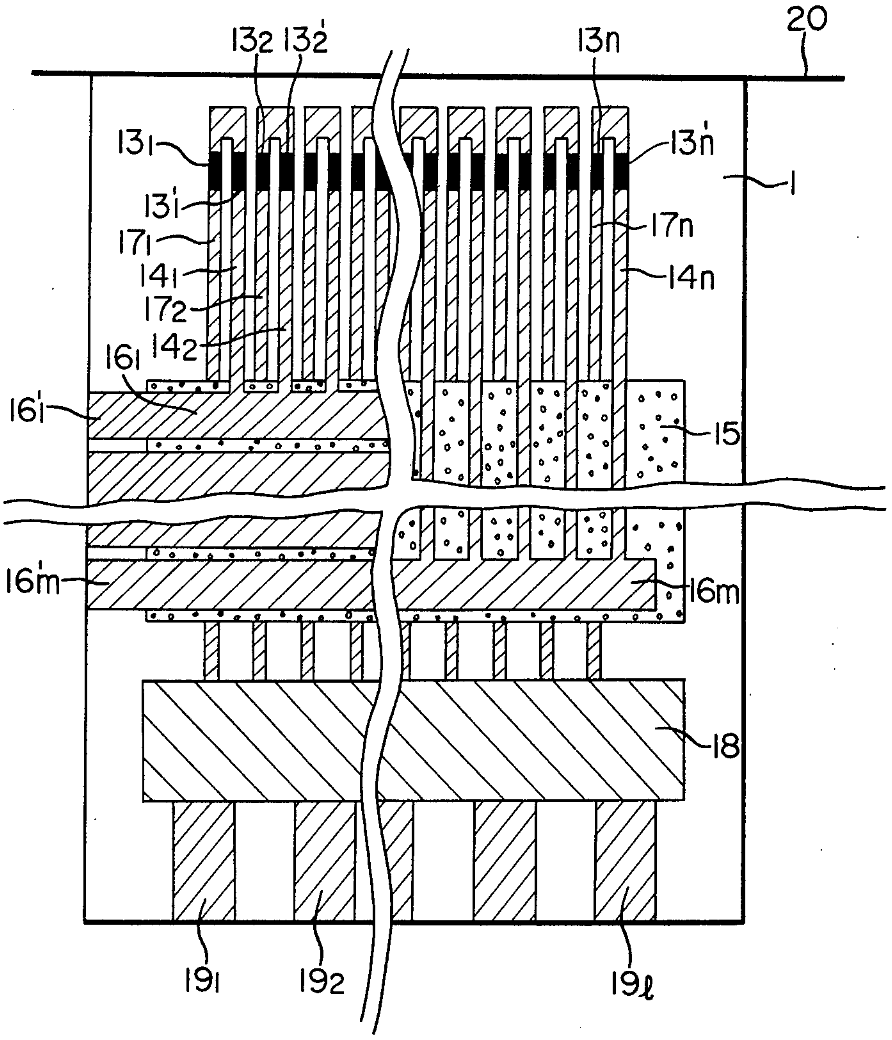
FIG. 6 is a schematic plan view of an embodiment similar to FIG. 5 but having a pair of resistive heaters associated with each actuating chamber.

FIG. 6 is a modification of embodiment of FIG. 5, and two resistive heaters are set for each actuating chamber (not shown). According to FIG. 6, "n" pieces of actuating chambers are provided with resistive heaters $(13_1, 13_1')$, $(13_2, 13_2')$, - - -, $(13_n, 13_n')$, respectively, that is, two resistive heaters for each actuating chamber. In FIG. 6, the same reference numerals as in FIG. 5 are used for the same portions as in FIG. 5. The embodiment of FIG. 6 is more advantageous than that in FIG. 5 since that in FIG. 6 can be produced more easily, in particular, formation of the pattern by etching is easier.

Figure 7:
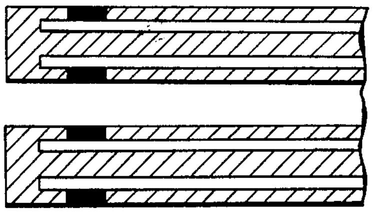
FIGS. 7 and 8 illustrate alternative resistive heater arrangements.
Figure 8:
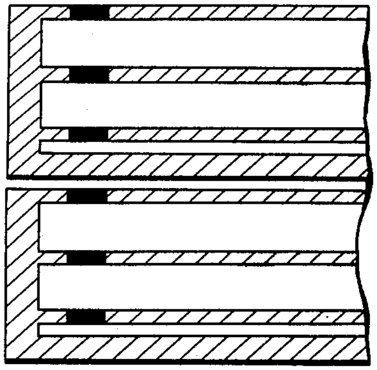

The structure of lead electrode is not limited to that in FIG. 5 or FIG. 6. For example, a plurality of return lead electrodes may be used for one actuating chamber as shown in FIG. 7 and FIG. 8.

The FIG. 5 embodiment will now be explained in further detail. On an alumina substrate (60 mm×90 mm) is formed a layer of $SiO_2$ of 4 microns thick by RF sputtering. Resistive heater of $HfB_2$ and an electrode of aluminum are formed by sputtering continuously and then selective etching is applied so as to form a pattern as shown in FIG. 5. Width of each of the lead electrodes, $13_1, 14_1, 13_2, 14_2, \text{- - -} 13_n, 14_n$, is 40 microns and the pitch is 50 microns. Size of each resistive heater is 40 microns in width, 300 microns in length and 100 microns in pitch. Resistance of each resistive heater is 200 ohms, and that of lead electrode is 20 ohms. Lead electrodes $14_1$, $14_2$ - - - , $14_n$ are taken out by combining 50 pieces of lead electrode through terminals $16_1'$, - - - , $16_m'$ as shown in FIG. 5, and in this case, n=500 and m=10. Insulating layer 15 is a sputtered film of $SiO_2$ of 5 microns thick and matrix wiring is provided at portion 18.

To the resulting substrate 1 is adhered a glass plate provided with grooves of 40 microns wide, 40 microns deep and 100 microns in pitch in such a way that each groove in the glass plate corresponds to each resistive heater, and then the orifice surface is ground so as to arrange the orifice array 20 in parallel with an array of resistive heaters. The resulting apparatus is fed with ink while rectangular waves of 40 V and 10 μsec. are applied at a cycle of 500 μsec. Ink droplets are stably ejected in response to the electric signals. The quality of the printed record when current is conducted to all of the 50 lead electrodes is not different from that when current is conducted to only one lead electrode.

Referring to FIG. 9–FIG. 12, the present invention is further explained below.

Figure 9:
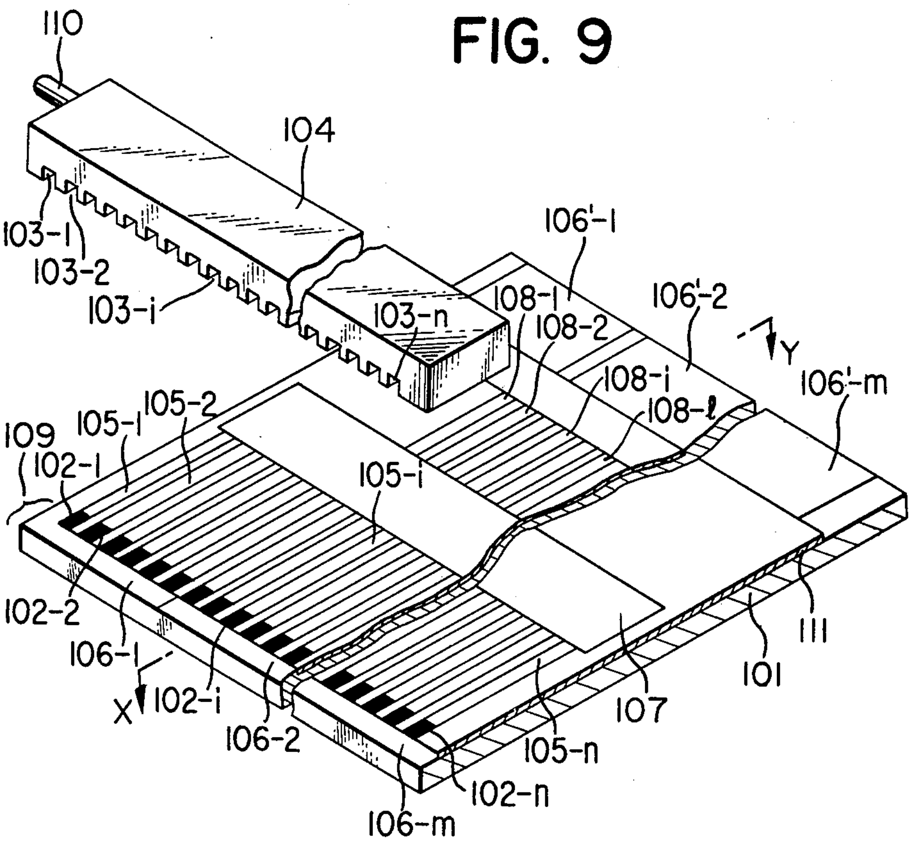
FIG. 9 is a schematic perspective view of yet another embodiment.

FIG. 9 is shown in a state of dismounting the recording apparatus for the purpose of explaining the recording head portion only, and details of the recording liquid supplying system, the driving circuit for the head and the like are not shown.

In the recording head of FIG. 9, conductive substrate 101 provided with insulating layer 111 having resistive heaters 102-1, 102-2, - - - 102-n as a heating element of an electrothermal transducer is integrated with grooved plate 104 provided with long groove patterns 103-1, 103-2, - - - 103-n which become liquid chambers for accommodating a recording liquid in such a way that the resistive heaters are brought to the corresponding long grooves.

Insulating layer 111 not only serves as an electrical insulating means, but as a heat accumulating layer for controlling transfer of heat generated by the resistive heater.

Resistive heaters 102-1, 102-2, - - - 102-n formed on substrate 101 are connected to selective electrodes (lead) 105-1, 105-2, - - - 105-n for applying selectively electric signals to the resistive heaters and also to common electrodes (lead) 106-1, 106-2, - - - 106-m. All the resistive heaters 102-1, 102-2 - - - 102-n may be connected to only one common electrode, or resistive heaters may be divided into units each of which comprises a plurality of resistive heaters may be and each unit may be connected to each common electrode. The conductive substrate may be used as an electrode (lead) for conducting current.

Further, as a means for applying current, lead terminals 106'-1, 106'-2 - - - 106'-m are arranged at a portion of substrate 101 opposite to a portion where ejecting orifices are formed. One lead terminal may be provided common to all the resistive heaters or one lead terminal may be provided for each unit of resistive heater comprising a plurality of resistive heaters. On the other hand, the selective electrodes are connected with a matrix wiring and "l" pieces of terminals for selective electrodes (l<n) 108-1, 108-2, - - - 108-l are connected with the matrix wiring. In this manner, common electrode (lead) terminals 106'-1, 106'-2 - - - 106'-m (or substrate 101 itself) for applying current and selective electrodes (lead) 105-1, 105-2 - - - 105-n are intervened by insulating layer 111 on substrate 101. Therefore, this arrangement gives a simpler structure of substrate surface than an arrangement where many electrodes and terminals are disposed on only one plane.

The recording head is provided with a conduit 110 for introducing a recording liquid supplied from reservoirs and feeding pipes (not shown) into the head.

Figure 10:
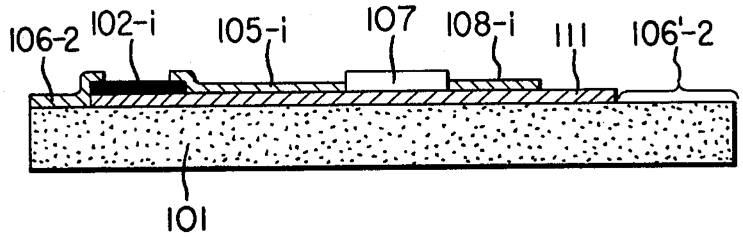
FIG. 10 is a section view taken along lines X—Y of FIG. 9.

FIG. 10 is a cross section taken along a dot and dash X—Y in FIG. 9. As is clear from FIG. 10, resistive heater 102-i is formed above substrate 101 with an intervening insulating layer 111. A conductive layer as a common electrode for conducting current to the resistive heater and another conductive layer as a selective electrode are formed at different planes as multi-layer electrodes with an intervening insulating layer.

Figure 11:
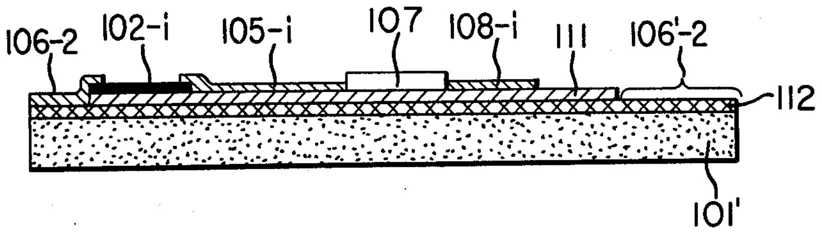
FIG. 11 is a section view of an alternate construction.

FIG. 11 shows a further embodiment of the present invention. Conductive layer 112 is formed on insulating layer 101'. The resulting member is used as a conductive layer for applying current, that is, a lead electrode.

As a material for conductive layer 112, there may be used metals such as A1, Au and the like. As a material for resistive heater 102-i, there may be used usual resistors such as $ZrB_2$, $HfB_2$, $Ta_2N$, W, Ni-Cr, thick film resistor such as Pd-Ag system, Ru system and the like, and $SiO_2$.

As substrate 101 or 101', in case of FIG. 10, there may be used various metal and crystalline Si substrates, and in case of FIG. 11, there is preferably used a ceramics substrate of a high thermal conductivity.

Further the surfaces of conductive layers (106-2, 105-i) and resistive heater (102-i) are preferably provided with a thin insulating protecting layer for preventing chemical reactions caused by contacting the recording liquid, current leak, mechanical friction and the like, or the substrate is preferably provided with a means for cooling so as to improve a long time continuous recording property.

In each of the above embodiments, common electrodes (lead) are disposed at the lower side of the insulating layer and selective electrodes (lead) are disposed at the upper side of the insulating layer, but the positional relation of the common electrodes and the selective electrodes may be reversed.

Figure 12:
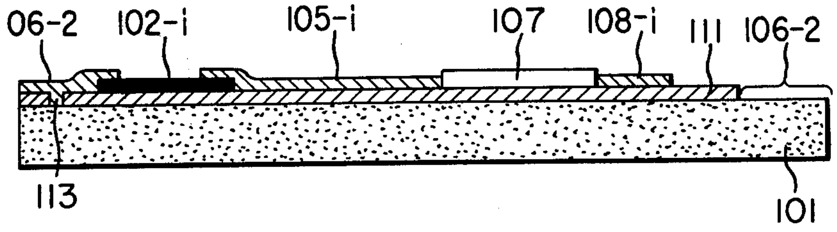
FIG. 12 is a section view of a further modification.

The electrode (lead) and the terminal may be connected by means of a through-hole 113 as shown in FIG. 12. Further, for the purpose of forming many selective electrodes (lead) on one plane with sufficient room, there may be alternately disposed a plurality of conductive layers and a plurality of insulating layers.

Operation of the recording head in FIG. 9 is briefly described below. From a recording liquid feeding system (not shown), a recording liquid is introduced into each long groove pattern, 103-1, 103-2 - - - , 103-n through a conduit 110, and then electrical signals (usually in a form of pulse produced by a pulse converter) are selectively applied to the above mentioned resistive heaters 102-1, 102-2 - - - 102-n by way of terminals 108-1, 108-2 - - - 108-l and 106'-1, 106'-2 - - - 106'm. As the result, in accordance with input signals, resistive heaters 102-1, 102-2 - - - 102-n, generate thermal pulses, and the recording liquid is subjected to volume expansion, vaporization and the like state change caused by the heat energy. The pressure change caused by the state change is transferred in the direction toward the ejecting orifices formed by the front edge portion 109 of substrate 101 and the end portion of the groove pattern of the grooved plate, and the resulting pressure change actuates to eject the recording liquid through the ejecting orifices and propel the droplets. By changing the strength of the actuating force the size of the droplets varies and recording is effected in accordance with the signals. The strength of the actuating force varies depending upon the amount of electric energy applied to the resistive heater, transmission efficiency of the converted heat energy to the ink, energy conversion efficiency of the resistor, size of the orifice, inner size of the groove, distance from orifice to resistor, actuating force applied to the ink, amount of ink subjected to the actuating force, and specific heat, thermal conductivity, boiling point, latent heat of vaporization and the like of the ink.

In case of a recording head where thermal energy actuates a recording liquid, where the distance between an ejecting orifice and a heat energy imparting portion is large, unstable ejection of droplets is liable to happen and therefore, it is not desirable to dispose electrodes and terminals connecting with the electrodes near the ejecting orifices. According to the above embodiment of recording head, it is not required that there is a space for disposing terminals connecting with electrodes (lead) near the ejecting orifices and thereby, ejection stability can be improved, and moreover, where a great many ejecting orifices are arranged, the structure of terminals connecting with electrodes (lead) can be simplified and a good result is obtained in practical apparatuses.

The following examples illustrate ink jet recording procedures by using the above mentioned recording apparatus.

EXAMPLE 1

By using a substrate of the structure of FIG. 10 there was produced a recording head. Substrate 101 (wafer produced by epitaxially growing a low resistant silicon on a high resistant silicon wafer; 0.6 mm thick), insulating layer 111 ($SiO_2$; 5 microns thick), resistive layer 102-9 ($ZrB_2$; 800 Å thick), and conductive layer (electrodes 106-2, 105-i; Al of 1000 Å thick) were laminated in the above mentioned order. Then, resistive heaters of 40 microns in width, 100 microns in thickness and 120 microns in pitch, and common electrodes and selective electrodes of predetermined patterns are formed by photo-etching.

The common electrodes were in such a form that every 30 pieces of resistive heaters were separated by heat oxidation layer. A $SiO_2$ layer 1 micron thick was formed thereon to produce a substrate structure having resistive heaters.

On the other hand, a groove pattern of 40 microns in width and 40 microns in depth was formed with a pitch of 120 microns.

The resulting grooved plate was integrated with the previously mentioned substrate by adhering each other to produce a recording head.

The resulting apparatus was fed with a recording liquid while a rectangular wave of 10 μsec. and 40 V was applied to the resistive heaters at a cycle of 500 μsec., and a stable ejection of droplets was able to be effected.

EXAMPLE 2

A substrate having a cross section as shown in FIG. 10 was prepared by the following procedures and used for a recording head.

A heat oxidation layer ($SiO_2$ layer) 5 microns thick was formed on a crystalline substrate (5 mm wide, 1.5 cm long, and resistivity of $10^{-2}$ ohm.cm). However, the heat oxidation layer was not formed at one end of the short side of the above-mentioned rectangular substrate as shown in FIG. 10. Resistive heaters, electrodes, terminals, protective layers were formed by substantially the same procedures as in Example 1.

40 pieces of the substrates were prepared and the long side were adhered one another with a curable adhesive (resistivity$>10^9$ ohm·cm). A grooved plate similar to that of Example 1 was integrated with the above mentioned substrate having resistive heaters (1200 pieces of nozzle). Under the same conditions as in Example 1, recording was effected on a recording paper A-4 size, and good recording was produced at a high speed.

As described above, where a means for conducting current for applying current (electric signal) to a means for generating ejection energy such as electrodes, leads, terminals and the like is composed of conductive layers laminated by using intervening insulating layers on a substrate, portions for disposing terminals are not limited to specified positions, but can be any optional positions suitable for the apparatus, and when it is desired to generate selectively droplets from the multi-orifice, it is not required to arrange many lead terminals at a narrow region of one substrate. In particular, in case of a head structure that a substrate having electrothermal transducers is integrated with a grooved plate provided with many grooves patterns serving as a liquid chamber, the fine ejecting orifices and their vicinity are free from choking and the ejection stability is improved and furthermore, the practical apparatus can be simplified.

In the above, the present invention has been explained referring to an ink ejecting method using heat energy, but the present invention can be also effected by using an ink ejecting method employing a piezoelectric element or other actuating portions having lead electrodes for applying electric signals.

The present invention is particularly suitable for an ink jet recording system in which many actuating portions are arranged at a high density, for example, 8-16 lines per mm. The returned electrodes are not always required to be combined to one lead, but may be led to the onside of the substrate by means of each bonding. In the present invention, it is desirable that resistive heaters and lead electrodes formed on the substrate are coated with an insulating material or protecting material for preventing leak from the resistive heaters and lead electrodes and preventing them from directly contacting the recording ink.

As mentioned above, according to the present invention, there can be provided an ink jet recording apparatus where many actuating chambers for ejecting ink are arranged at a high density and with a high precision. Moreover, such apparatus can be easily manufactured, and the quality of the printed letters and signs is very good.

What we claim is:

1. In an ink jet recording apparatus which comprises a plurality of actuating portions for a recording ink, lead electrodes connected to said actuating portions for conducting current thereto, said actuating portions and lead electrodes being formed on a substrate, each of said actuating portions being provided with a chamber communicating with a port for ejecting the recording ink and for accommodating the recording ink before ejection, the ink being ejected from the port to form droplets for recording on a recording member, the improvement comprising a conductive member disposed on a surface of the substrate which is at a side where the ink droplets are ejected, said conductive member being a part of said lead electrodes.

2. The ink jet recording apparatus according to claim 1, wherein said lead electrodes are composed of a thin film conductive layer.

3. The ink jet recording apparatus according to claim 1, wherein said lead electrodes are composed of an electrode connected to each actuating portion and an electrode common to a plurality of actuating portions.

4. The ink jet recording apparatus according to claim 1 in which said conductive member is in the form of a thin film.

5. The ink jet recording apparatus according to claim 1 in which said conductive member is in the form of a thick film.

6. The ink jet recording apparatus according to claim 1 in which said conductive member is in the form of a bar.

7. The ink jet recording apparatus according to claim 1 in which each actuating portion has a resistive heater.

8. In an ink jet recording apparatus which comprises a plurality of actuating portions for a recording ink, lead electrodes connected to said actuating portions for conducting current thereto, said actuating portions and lead electrodes being formed on a substrate, each of said actuating portions being provided with a chamber communicating with a port for ejecting the recording ink and for accomodating the recording ink before ejection, the ink being ejected from the port to form droplets for recording on a recording member, the improvement wherein said lead electrodes include a plurality of common electrodes each of which is separately connected to a corresponding one of said actuating portions and led to terminals which are located at a side opposite to the ejection port with respect to said one actuating portion.

9. The ink jet recording apparatus according to claim 8, wherein said lead electrodes are disposed on the same plane as said actuating portions.

10. The ink jet recording apparatus according to claim 8 in which said lead electrodes are composed of a thin film conductive layer.

11. The ink jet recording apparatus according to claim 8, wherein at least one lead electrode is connected the associated actuating portion and has a returning portion at a region between the associated actuating portion and the corresponding ejection port.

12. The ink jet recording apparatus according to claim 8, wherein said actuating portions each include a resistive heater.

13. In an ink jet recording apparatus which comprises a plurality of actuating portions for a recording ink, lead electrodes connected to said actuating portions for conducting current thereto, said actuating portions and lead electrodes being formed on a substrate, each of said actuating portions being provided with a chamber communicating with a port for ejecting the recording ink and for accommodating the recording ink before ejection, the ink being ejected from the port to form droplets for recording on a recording member, the improvement wherein at least one chamber is provided with a plurality of associated actuating portions which are separated from one another, and lead electrodes connected to said associated actuating portions are led to terminals which are located at a side opposite to the corresponding ejection port with respect to said actuating portions.

14. The ink jet recording apparatus according to claim 13, wherein said lead electrodes are disposed on the same plane as said actuating portions.

15. The ink jet recording apparatus according to claim 13 in which said lead electrodes are composed of a thin film conductive layer.

16. The ink jet recording apparatus according to claim 13 in which at least one lead electrode is connected with the associated actuating portion and the lead electrode has a returning portion at a region between said actuating portion and its ejection port.

17. The ink jet recording apparatus according to claim 13 in which said actuating portions each include a resistive heater.

18. In an ink jet recording apparatus which comprises a plurality of actuating portions for a recording ink, lead electrodes connected to said actuating portions for conducting current thereto, each of said actuating portions being provided with a chamber communicating with a port for ejecting the recording ink and for accommodating the recording ink before ejection, the ink being ejected from the port to form droplets for recording on a recording member, the improvement wherein said actuating portions are disposed on a conductive member with an insulating layer therebetween, said conductive member being a part of said lead electrodes.

19. The ink jet recording apparatus according to claim 18 in which said conductive member is a plate member.

20. The ink jet recording apparatus according to claim 18 in which said conductive member is in the form of a film.

21. The ink jet recording apparatus according to claim 19 in which said lead electrodes are in the form of a film.

22. The ink jet recording apparatus according to claim 18 in which each lead electrode is composed of an electrode connected to an actuating member and to a common electrode and the common electrode is connected with said conductive member.

* * * * *

UNITED STATES PATENT AND TRADEMARK OFFICE

CERTIFICATE OF CORRECTION

PATENT NO. : 4,458,256
DATED : July 3, 1984
INVENTOR(S) : YOSHIAKI SHIRATO, ET AL.

It is certified that error appears in the above-identified patent and that said Letters Patent is hereby corrected as shown below:

Cover Page, under title "Inventors": change "Michiko Takahashi" to --Michiko Tanaka--.

Column 1, lines 55 and 56, change "patent application" to --Patent Application--.

Column 6, line 51, change "of" to --in--.

Column 10, line 58, after the comma insert --a plurality of--;

line 59, after "said" insert --plurality of--;

UNITED STATES PATENT AND TRADEMARK OFFICE
CERTIFICATE OF CORRECTION

PATENT NO. : 4,458,256 Page 2 of 4
DATED : July 3, 1984
INVENTOR(S) : YOSHIAKI SHIRATO, ET AL.

It is certified that error appears in the above-identified patent and that said Letters Patent is hereby corrected as shown below:

Column 10, line 63, after "ink" insert --from a side surface of the substrate--;

line 67, after "member"insert --being-- and change "a" to --the side--;

line 68, delete "which is at a side".

Column 11, line 11, change "in which" to --, wherein--;

line 14, change "in which" to --, wherein--;

line 17, change "in which" to --, wherein--;

line 20, change "in which" to --, wherein--;

line 22, after the comma insert --a plurality of--;

line 23, after "said" insert --plurality of--;

line 24, after "said" insert --plurality of--;

line 29, after "the" (first occurrence) insert --recording--;

line 31, after "said" insert --plurality of-- and change "common" to --return--;

UNITED STATES PATENT AND TRADEMARK OFFICE

CERTIFICATE OF CORRECTION

PATENT NO. : 4,458,256

DATED : July 3, 1984

INVENTOR(S) : YOSHIAKI SHIRATO, ET AL.

It is certified that error appears in the above-identified patent and that said Letters Patent is hereby corrected as shown below:

Column 11, line 33, after "and" insert --said plurality of lead electrodes are--;

line 35, change "one" to --plurality of--;

line 36, change "portion" to --portions--;

line 41, change "in which" to --, wherein--;

line 44, after "connected" insert --to--;

line 52, after the comma insert --a plurality of--;

line 53, after "said" insert --plurality of--;

line 54, after "said" insert --plurality of--.

Column 12, line 5, after "the" (first occurrence) insert --recording--;

line 7, change "wherein" to --comprising-- and delete "is";

line 9, change "and" to --said--;

line 10, change "are" to --being--;

line 12, after "said" insert --plurality of--;

UNITED STATES PATENT AND TRADEMARK OFFICE

CERTIFICATE OF CORRECTION

PATENT NO. : 4,458,256

DATED : July 3, 1984

INVENTOR(S) : YOSHIAKI SHIRATO, ET AL.

It is certified that error appears in the above-identified patent and that said Letters Patent is hereby corrected as shown below:

Column 12, line 18, change "in which" to --, wherein--;

line 21, change "in which" to --, wherein--;

line 26, change "in which" to --, wherein--;

line 41, change "in which" to --, wherein--;

line 44, change "in which" to --, wherein--;

line 47, change "19 in which" to --18, wherein--;

line 50, change "in which" to --, wherein--.

Signed and Sealed this

*Ninth* Day of *April 1985*

[SEAL]

*Attest:*

DONALD J. QUIGG

*Attesting Officer* *Acting Commissioner of Patents and Trademarks*